Feb. 9, 1971 C. W. GAY, JR., ET AL 3,561,943
PROCESS FOR PREPARING A SOIL CONDITIONER
FROM WOOD WASTES MATERIALS
Filed Feb. 2, 1968
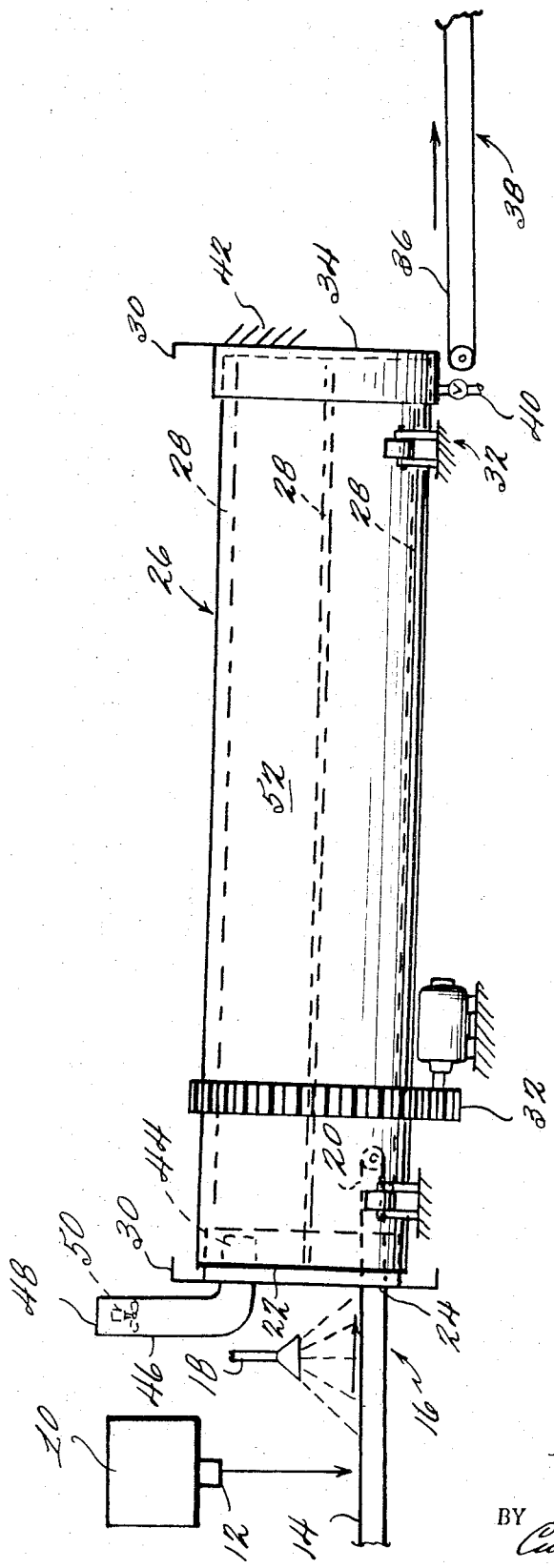
INVENTORS
CHARLES W. GAY, JR.
DONALD D. DWYER
BY Cushman, Darby & Cushman
ATTORNEYS United States Patent Office 3,561,943
Patented Feb. 9, 1971

3,561,943
PROCESS FOR PREPARING A SOIL CONDITIONER FROM WOOD WASTES MATERIALS
Charles W. Gay, Jr., 603 W. Las Cruces Ave., and Donald D. Dwyer, 3015 Fairway Drive, both of Las Cruces, N. Mex. 88001
Filed Feb. 2, 1968, Ser. No. 702,703
Int. Cl. C05f 11/08
U.S. Cl. 71—9                                  8 Claims

ABSTRACT OF THE DISCLOSURE

Finely divided wood waste material such as ground pine bark or sawdust or the like, separately or in admixture, is mixed with a microbial source such as ground natural manure, sewage sludge or industrial wastes. To the mixture there is also added water and the total mixture is then heated, with agitation, in the presence of a molecular oxygen containing gas, such as air, in amounts sufficient to cause aerobic decomposition.

---

This invention relates to a soil conditioner and a method of making the same and more particularly to a process for the preparation of agricultural nutrient carriers and soil conditioning agents from wood waste materials such as sawdust, finely divided pine bark and the like.

Heretofore, efforts to produce a soil conditioner have been disadvantageous in the requirement of expensive reagents to transform waste material into a commercially acceptable product or in the requirement of extensive periods of time to process the waste material. This latter consideration is quite significant since the amount of wood wastes created in a given period of time far exceeds the output of conventional processes designed to transform these wastes materials to a useable, commercial product.

As a result, there remains today vast amounts of wood wastes, the disposal of which has created serious problems. The government, public and industry are increasingly becoming concerned with conventional wood waste disposal techniques, such as by burning these waste materials, and with the deleterious effect of these techniques in polluting the air. Thus, one of the principal objects of the present invention is to provide a simple, efficient, method for treating wood waste materials which not only circumvents disposal and air pollution problems but also produces an excellent commercially acceptable soil conditioning agent.

Other objects and advantages of this invention will be readily apparent from the following detailed description thereof.

In accordance with the present invention, finely divided wood waste material such as ground pine bark or sawdust or the like, separately or in admixture, is mixed with a microbial source such as ground natural manure, sewage sludge or industrial wastes. To the mixture there is also added water and the total mixture is then heated, with agitation, in the presence of a molecular oxygen containing gas, such as air, in amounts sufficient to cause aerobic decomposition.

The wood waste material can be comminuted raw pine bark, although it will be recognized that other wood waste materials such as sawdust and the like can also be similarly treated. The raw pine bark is ground to obtain a particle size range of 0.125 in. or less, and preferably within the range of 0.50 to 0.016 in. The comminuted raw pine bark, which optionally can be replaced with up to about 50% by weight of sawdust without any significant reduction in the quality of product produced, is then admixed with a suitable microbial source and water. Preferably, the microbial source can be natural manure, such as sheep or cow manure, or sewage sludge although it will be recognized that other microbial sources such as industrial wastes and the like can also be effectively used. Generally, when the microbial source is a livestock manure, it is ground to obtain a particle size ranging from about 0.50 to 0.016 in. The weight ratio of wood waste material to microbial source material ranges from about 20:1 to 1:1 and, preferably, about 10:1 to 20:1, with a weight ratio of 10:1 being optimum.

To this mixture water is added. A portion or the whole of required amount of water can be mixed with the wood waste material simultaneously with the microbial source material. Alternatively, the water can be added to the mixture of wood waste and microbial source materials. Generally, the amount of water used will constitute about 50 to 75, preferably about 60 to 67 weight percent of the total mixture. Advantageously, the weight ratio of wood waste material to water ranges from about 1:1 to 1:3 and, preferably, from about 2:3 to 1:2, with a weight ratio of 1:2 being optimum. The temperature of the water added to the mixture is a significant factor in reducing or minimizing the time required to process the wood waste material to produce a commercially acceptable soil conditioner. Thus, it has ben found that the temperature of the processing water should be maintained between about 35 to 45° C., and, preferably, at about 40° C.

The mixture of wood waste material, microbial source material and water is then contacted in an aeration zone with a sufficient amount of molecular oxygen containing gas, such as air, while agitating the mixture, to insure rapid aerobic decomposition. The temperature of the air must be such to provide an aeration zone temperature between 35 to 45° C., and, preferably, about 40° C. Conveniently air is introduced into the aeration zone at a flow rate of about 0.12 to 1.0, and, preferably, about 0.50 to 0.67 ft.³/min. thus providing about 3.2 to 4.5 moles of air, calculated as $O_2$ per ft.³ of wood waste particles.

In a preferred embodiment of the present invention, the wood waste material is transformed into a valuable soil conditioner in a continuous fashion by continuously delivering the mixture of wood waste, microbial source material and water to one end of a hollow, tilted open-ended, elongated cylinder, revolving the cylinder about its longitudinal axis, continuously introducing at one end of the cylinder an aeration medium comprising a molecular oxygen containing gas, venting the aeration medium adjacent the other open-end of the cylinder, removing excess moisture and continuously withdrawing the treated mixture from the end of the cylinder opposite the mixture feed end thereof. If desired, the excess moisture removed from the treated mixture and/or processed wood waste material in the proportion of about 5 to 15 percent, preferably 10 volume percent can be recycled for admixture with the wood waste material as a convenient supply of microbial source material and water.

The continuous production of a soil conditioner in accordance with the present invention will become more readily apparent by reference to the following detailed description and accompanying drawing which is a schematic side elevational view showing apparatus suitably used in the processing of waste wood material to produce a soil conditioner.

Referring more particularly to the drawings, 10 is a container housing a mixture of ground, pine bark and livestock manure. The container 10 can take any convenient form such as a hopper or bin or the like. The container 10 is provided with outlet means 12 for delivering the ground wood manure mixture to the upper surface 14 of an endless conveyor means 16. Outlet means 12 can be operated manually or automatically and can be provided with a conventional timing mechanism (not shown) to control the rate of delivery of the mixture to the conveyor means 16 so that a predetermined amount of wood waste material can be delivered to the conveyor means 16, continuously or intermittently, as desired.

Also positioned above the upper surface of endless conveyor means 16 is liquid spray means 18 for delivery of an aqueous medium to the wood waste charge prior to its introduction into an aeration zone. The aqueous medium delivered by spray means 18 can be water or an aqueous solution of a microbial source including a recycle stream of excess moisture or liquid removed from the product being withdrawn from the aeration zone. Additionally, solutions or dispersions of other valuable soil additives including fertilizers, trace elements, fungicides and systemic insecticides can also be applied to the wood waste mixture through spray means 18 or they can be added to the wood waste material prior to or after its passage under spray means 18. Temperature regulating means (not shown) for the spray medium can also be provided to maintain the temperature therein within the limits noted above. Conventional temperature regulating means can include for instance, a thermostatically controlled burner or a double pipe heat exchanger or the like.

The discharge end 20 of endless conveyor means 16 is received within one open end 22 through inlet port 24 of elongated, hollow cylinder 26 and extends within the cylinder a distance sufficient to insure complete delivery of the wood waste charge in the cylinder, thus avoiding any spillage or waste of the charge.

The interior surface of the elongated cylinder 26 is provided with one or more radially inwardly directed fin members 28 which extend substantially the longitudinal extent of the cylinder 26. The fin members 28 assist in lifting the wood waste charge from the lowermost point in the cylinder 26 on rotation of the latter to an intermediate zone therein, thereby increasing the efficiency of the aeration operation conducted within the cylinder 26.

The elongated cylinder 26 is appropriately supported by conventional means 30 so that it is disposed at an angle, ranging between about 1° to 5° to the horizontal, the elevated end 22 constituting the wood waste feed inlet end thereof. The tilted cylinder is also provided with conventional rotational means 32, which on activation, cause the cylinder to revolve about its longitudinal axis. Preferably, the cylinder is rotated at a rate between about 0.2 to 0.04 r.p.m. The rate at which the wood waste mixture travels from one end of the cylinder to the other end is thus controlled by the tilting angle of the chamber and the rotational speed thereof. The open discharge or lower end 34 of the cylinder 26 is positioned above the upper surface 36 of conveyor means 38 which transports the soil conditioner discharged from the cylinder 26 onto the conveyor to, for instance, a packaging area where the soil conditioner can be conveniently bagged or prepared for shipment to potential users. Adjacent the bottom or lower end 34 of the cylinder 26 there is also provided drain means 40 through which flows excess moisture or liquid from the prepared soil conditioner. This excess liquid can, if desired, be recycled to spray means 18 through suitable piping or conduit means (not shown) as a supplement supply of microbial source material for admixture with the wood waste charge. Adjacent the top of the lower end 34 there is provided conventional vent means 42 to vent the gaseous atmosphere within the cylinder to the outside.

Communicating with the interior of the cylinder 26 through the elevated or feed inlet end 22, adjacent the top portion thereof, is the discharge end or nozzle 44 of aeration medium inlet means 46. The intake end 48 of inlet means 46 is suitably connected to a source of aeration medium, i.e., a molecular oxygen-containing gas such as air, and is provided with conventional fan means 50 to continuously deliver the aeration medium to the aeration zone 52. The flow rate of aeration medium into the aeration zone 52 is maintained between about 1000 to 6000, and preferably, 3000 to 4000 cubic feet per minute. The temperature of the aeration medium is about 70 to 100° C., preferably about 80 to 90° C. to maintain within the aeration zone a temperature of about 35 to 40° C. and preferably about 40° C.

The wood waste mixture is advantageously processed into a commercially acceptable soil conditioner in a period of time as short as 12–24 hours which is significantly less than the processing time required in known methods for producing soil conditioners from waste materials.

The horticultural value of a soil conditioner, made according to the above-described process, was compared with that of peat moss in the following experiments.

Five plants of each of the following species: (1) tuberous begonias, (2) camellias, (3) crysanthemums, (4) gardenias, (5) geraniums, and (6) philodendron vines were potted in a mixture of the soil conditioner of this invention and sand, the volume ratio of soil conditioner to sand being approximately 2:1. Five plants of each of the above species were also potted in a mixture of commercial peat moss and sand, in essentially the same proportions of peat moss to sand, i.e., 2:1. All the plants were grown under normal greenhouse conditions and all were watered identically.

Observations were periodically made regarding the growth rate, leaf color, flower size and abundance, wilting, disease tolerance and plant size of all the above plants. In every case, all plants growing in the soil conditioner of this invention were as vigorous as those growing in the peat moss. No significant differences in any of the above categories were noted between the plants growing in the two mediums. The plants growing in the soil conditioner of this invention exhibited the same degree of health and bloom as those growing in the peat moss.

It will thus be seen that there has been provided by this invention a product and method in which the various objects hereinbefore set forth, together with many practical advantages, are successfully achieved. As various possible embodiments may be made of the novel features of the above invention, all without departing from the scope thereof, it is to be understood that all matter hereinbefore set forth or shown in the accompanying drawings is to be interpreted as illustrative, and not in a limiting sense.

What is claimed is:

1. A continuous process for preparing a soil conditioner from wood waste particles, comprising
   (a) mixing the wood waste particles comprising comminuted pine bark having a particle size up to about 0.125 inch with a microbial source material and an aqueous medium to provide a mixture wherein the weight ratio of wood waste particles to microbial source material ranges between about 20:1 to 1:1 and the weight ratio of wood waste particles to aqueous medium ranges between about 1:1 to 1:3, the temperature of the aqueous medium being maintained between about 35 to 45° C.,
   (b) introducing the resulting mixture into an elongated cylinder open at both ends through one open end thereof, said cylinder being disposed at an angle between 1 to 5° to the horizontal,
   (c) rotating said elongated cylinder about its longitudinal axis thereby transporting said mixture from said one end thereof to the other open end thereof,
   (d) continuously introducing an aeration medium into said rotating elongated cylinder through an open end thereof, said aeration medium being supplied in amounts to provide about 3.2 to 4.5 moles of air, calculated as $O_2$, per cubic foot of wood waste particles thereby causing aerobic decomposition of said mixture to produce said soil conditioner during the passage of the mixture from said one end to said other end of the cylinder, (e) withdrawing said conditioner from said other open end of the cylinder, and (f) repeating steps (a) to (e) as long as desired.

2. The continuous process of claim 1 wherein the wood waste particles include sawdust in amounts up to about 50 weight percent based on the total weight of the wood waste particles.

3. The continuous process of claim 1 wherein the microbial source material is a natural manure.

4. The continuous process of claim 1 wherein the microbial source material is sewage sludge.

5. The continuous process of claim 1 wherein the elongated cylinder is revolved at a rate of about 0.2 to 0.04 r.p.m.

6. The continuous process of claim 1 wherein the aeration medium is a molecular oxygen containing gas and is introduced into the cylinder at a temperature between 80 to 90° C.

7. The continuous process of claim 1 wherein the weight ratio of wood waste particles to aqueous medium ranges between about 1:2.

8. The continuous process of claim 1 which includes (g) removing excess liquid from the soil conditioner at said other open end of the cylinder and (h) recycling the resulting removed excess liquid to step (a) above.

References Cited

UNITED STATES PATENTS

| | | | |
|---|---|---|---|
| 2,035,286 | 3/1936 | Wenzel | 71—24 |
| 2,241,734 | 5/1941 | Petersen | 71—9 |
| 2,867,521 | 1/1959 | Jeffreys | 71—25 |
| 3,357,812 | 12/1967 | Snell | 71—23 |

REUBEN FRIEDMAN, Primary Examiner

C. N. HART, Assistant Examiner

U.S. Cl. X.R.

71—23, 25, 12, 21